(12) United States Patent
Nakamura et al.

(10) Patent No.: US 7,169,734 B2
(45) Date of Patent: Jan. 30, 2007

(54) EXHAUST GAS PURIFYING CATALYST AND METHOD OF PRODUCING SAME

(75) Inventors: Masanori Nakamura, Kanagawa (JP); Katsuo Suga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/059,454

(22) Filed: Feb. 16, 2005

(65) Prior Publication Data

US 2005/0170955 A1 Aug. 4, 2005

Related U.S. Application Data

(62) Division of application No. 09/985,793, filed on Nov. 6, 2001, now abandoned.

(30) Foreign Application Priority Data

Nov. 9, 2000 (JP) .............................. 2000-341458

(51) Int. Cl.
  *B01J 23/58* (2006.01)
  *B01J 23/63* (2006.01)
(52) U.S. Cl. ...................... 502/302; 502/303; 502/304; 502/328; 502/330
(58) Field of Classification Search ................ 502/327, 502/328, 333, 334, 302, 303, 304, 330
See application file for complete search history.

(56) References Cited

U.S. PATENT DOCUMENTS

| | | | |
|---|---|---|---|
| 4,888,320 A | 12/1989 | Ihara | |
| 4,931,419 A | 6/1990 | Blanchard et al. | |
| 5,753,580 A | 5/1998 | Hayashi et al. | |
| 5,948,723 A | 9/1999 | Sung | |
| 5,989,507 A | 11/1999 | Sung et al. | |
| 6,087,298 A | 7/2000 | Sung et al. | |
| 6,294,140 B1 | 9/2001 | Mussmann et al. | |
| 6,518,213 B1 | 2/2003 | Yamamoto et al. | |
| 6,589,901 B2 | 7/2003 | Yamamoto et al. | |
| 2003/0021745 A1 | 1/2003 | Chen | |

FOREIGN PATENT DOCUMENTS

| | | |
|---|---|---|
| EP | 0 407 915 A2 | 1/1991 |
| EP | 0 443 765 A1 | 8/1991 |

(Continued)

*Primary Examiner*—Wayne A. Langel
(74) *Attorney, Agent, or Firm*—Foley & Lardner LLP

(57) ABSTRACT

An exhaust gas purifying catalyst for an internal combustion engine of an automotive vehicle. The exhaust gas purifying catalyst comprises a monolithic substrate. A first catalytic layer is formed on the monolithic substrate. The first catalytic layer contains at least one noble metal selected from the group consisting of rhodium, platinum and palladium, compound of at least one metal selected from the group consisting of alkali metal, alkaline earth metal and rare earth metal, and alumina. Additionally, a second catalytic layer is formed on the first catalytic layer and contains rhodium, at least one noble metal selected from the group consisting platinum and palladium, compound of at least one metal selected from the group consisting of alkali metal, alkaline earth metal and rare earth metal, and alumina. A content of the compound of the at least one metal in the second catalytic layer is larger than that in the first catalytic layer.

8 Claims, 1 Drawing Sheet

FOREIGN PATENT DOCUMENTS

| | | |
|---|---|---|
| EP | 0 764 459 A2 | 3/1997 |
| EP | 1 046 423 A2 | 10/2000 |
| JP | 60-99340 A | 6/1982 |
| JP | 4-131140 A | 5/1992 |
| JP | 5-168860 A | 7/1993 |
| JP | 7-132226 A | 5/1995 |
| JP | 9-57099 A | 3/1997 |
| JP | 9-253454 A | 9/1997 |
| JP | 9-327624 A | 12/1997 |
| JP | 2000-54825 A | 2/2000 |
| WO | WO 95/00235 A1 | 1/1995 |
| WO | WO 95/35152 A1 | 12/1995 |

FIGURE
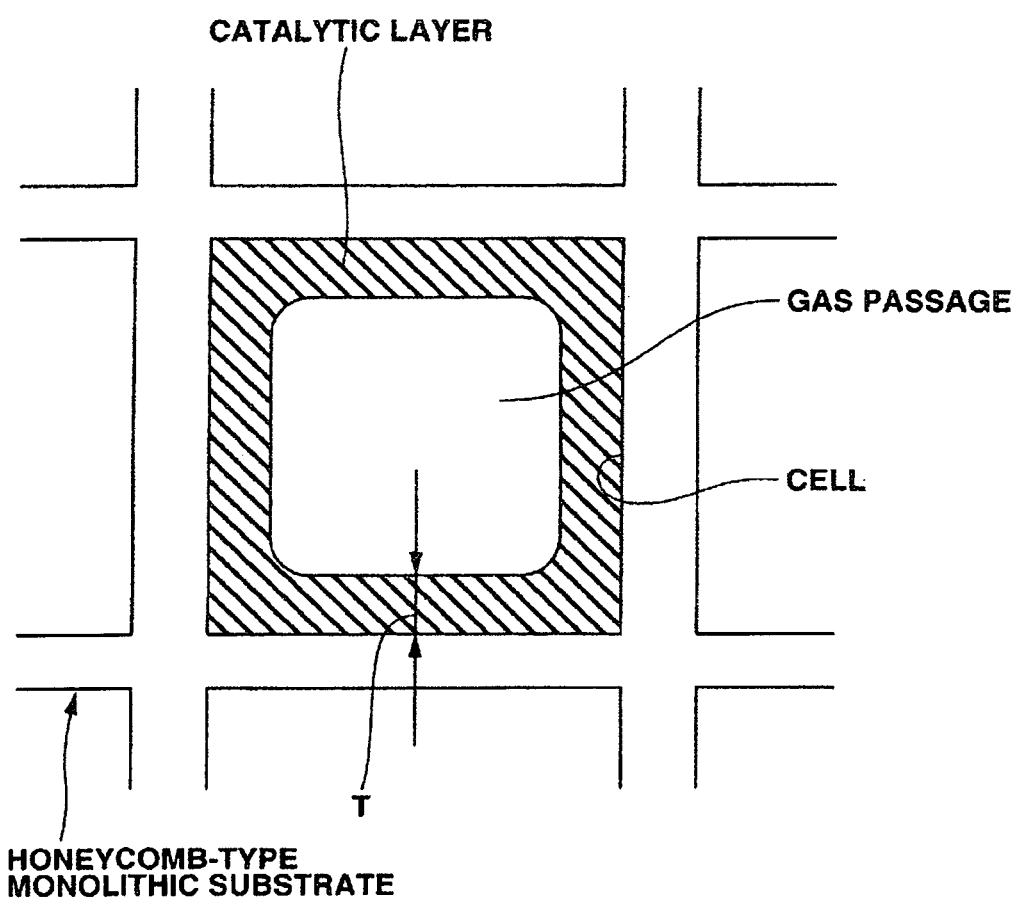

EXHAUST GAS PURIFYING CATALYST AND METHOD OF PRODUCING SAME

The present application is a divisional of U.S. application Ser. No. 09/985,793, filed Nov. 6, 2001, now abandoned, the entire contents of which are incorporated herein by reference.

BACKGROUND OF THE INVENTION

This invention relates to improvements in an exhaust gas purifying catalyst and a method of producing the catalyst, and more particularly to the exhaust gas purifying catalyst for removing hydrocarbons (HC), carbon monoxide (CO) and nitrogen oxides (NOx) in exhaust gas discharged from an internal combustion engine of an automotive vehicle, a boiler or the like, particularly for effectively reducing NOx in exhaust gas in an oxygen-excessive region or lean region, and the method of producing such a catalyst.

Hitherto, automotive vehicles of a low fuel consumption have been eagerly desired from the view points of exhaustion of petroleum resource and warming-up phenomena of the earth. Regarding automotive vehicles with a gasoline-fueled engine, attention has been paid on development of automotive vehicles provided with a so-called lean-burn engine. In the automotive vehicles provided with the lean-burn engine, exhaust gas is in an oxygen-excessive or lean region (atmosphere) in which an air-fuel (air/fuel) ratio is leaner or larger than a stoichiometric value. In case that a usual three-way catalyst is used in the lean region, removing or reducing NOx can be insufficient under the effect of the excessive oxygen. Accordingly, development of a catalyst for effectively reducing NOx even under an oxygen-excessive condition has been desired.

A variety of catalysts for reducing NOx in such a lean region have been proposed. One of them is disclosed in Japanese Patent Provisional Publication No. 5-168860 in which Pt and lanthanum (NOx adsorbing or trapping agent) are carried on a porous carrier so that NOx is adsorbed in the lean region and released in a stochiometric region in which exhaust gas has a stoichiometric air-fuel (air/fuel) ratio.

However, fuel and lubricating oil used in the engine contains sulfur (S) which is to be discharged in the form of oxide from the engine. Accordingly, the NOx adsorbing agent is subjected to poisoning with sulfur, and therefore lowering in NOx adsorbing ability occurs in the NOx adsorbing agent. This is a so-called sulfur-poisoning.

In order to protect the NOx adsorbing agent or material from such sulfur-poisoning, the present inventors have proposed the following technology in Japanese Patent Provisional Publication No. 2000-54825: A catalyst has a catalytic layer which includes an inner layer, and a surface layer formed on the inner layer. The surface layer contains a S adsorbing material (such as magnesium Mg) which can adsorb sulfur but readily decompose sulfur. The inner layer contains a NOx adsorbing material (such as barium Ba).

Additionally, Japanese Patent Provisional Publication No. 7-132226 discloses a technology in which the concentration of alkaline metal or alkaline earth metal is lowered in a direction from the upstream side to the downstream side relative to flow of exhaust gas.

SUMMARY OF THE INVENTION

However, as a result of the present inventors' investigations on the above conventional or earlier technologies, it has been confirmed that there is the following rooms for improvement in the above technologies:

The technology as described in Japanese Patent Provisional Publication No. 2000-54825 proposes a catalyst which exhibits a high performance against the sulfur-poisoning; however the catalyst is slightly lowered in performance from the viewpoint of adsorption of NOx.

Japanese Patent Provisional Publication No. 7-132226 has no description of sulfur-poisoning in its specification. In regard to this Publication, the present inventors have found that the effect on sulfur-poisoning becomes high by locating a plurality of catalytic layers one upon another.

Additionally, a catalyst arranged similarly to those in the above technologies is disclosed in Japanese Patent Provisional Publication No. 9-57099; however, this catalyst is quite different in use from the catalysts in the above technologies.

Therefore, it is an object of the present invention to provide an improved exhaust gas purifying catalyst and a method of producing the same catalyst, by which drawbacks encountered in the conventional and earlier technologies can be effectively overcome.

Another object of the present invention is to provide an improved exhaust gas purifying catalyst and a method of producing the same catalyst, by which NOx can be effectively adsorbed, released and reduced (removed) while preventing sulfur-poisoning of the catalyst.

A further object of the present invention is to provide an improved exhaust gas purifying catalyst and a method of producing the same catalyst, in which compound of alkali metal and/or like is contained in a larger amount in a surface layer part of a catalytic layer than that in an inner layer part of the same, while the compound of alkali metal and/or the like is mixed with a slurry for forming the catalytic layer in a method of producing the catalyst.

An aspect of the present invention resides in an exhaust gas purifying catalyst comprising a monolithic substrate. A first catalytic layer (A) is formed on the monolithic substrate. The first catalytic layer contains at least one noble metal selected from the group consisting of rhodium, platinum and palladium, compound of at least one metal selected from the group consisting of alkali metal, alkaline earth metal and rare earth metal, and alumina. Additionally, a second catalytic layer (B) is formed on the first catalytic layer and contains rhodium, at least one noble metal selected from the group consisting platinum and palladium, compound of at least one metal selected from the group consisting of alkali metal, alkaline earth metal and rare earth metal, and alumina. A content of the compound of the at least one metal in the second catalytic layer (B) is larger than that in the first catalytic layer (A).

Another aspect of the present invention resides in an exhaust gas purifying catalyst comprising a monolithic substrate. A catalytic layer is coated on the monolithic substrate. The catalytic layer contains at least one noble metal selected from the group consisting of platinum, palladium and rhodium, compound of at least one metal selected from the group consisting of alkali metal, alkaline earth metal and rare earth metal, and alumina. The catalytic layer has a surface section including a surface of the catalytic layer, and an inner section located inside relative to the surface section. In this catalytic layer, a difference in concentration between the surface section and the inner section of the catalytic layer is within a range of ±10%.

A further aspect of the present invention resides in a method of producing an exhaust gas purifying catalyst including a monolithic substrate; a first catalytic layer (A)

formed on the monolithic substrate, the first catalytic layer containing at least one noble metal selected from the group consisting of rhodium, platinum and palladium, compound of at least one metal selected from the group consisting of alkali metal, alkaline earth metal and rare earth metal, and alumina; and a second catalytic layer (B) formed on the first catalytic layer and containing rhodium, at least one noble metal selected from the group consisting of platinum and palladium, compound of at least one metal selected from the group consisting of alkali metal, alkaline earth metal and rare earth metal, and alumina, a content of the compound of at least one metal in the second catalytic layer (B) being larger than that in the first catalytic layer (A). The producing method comprises (a) preparing first powder by causing the at least one noble metal selected from the group consisting of rhodium, platinum and palladium to be carried on alumina; (b) preparing a first aqueous solution of the compound of at least one metal selected from the group consisting of alkali metal, alkaline earth metal and rare earth metal; (c) forming a first mixture of the first powder and the first aqueous solution; (d) grinding the first mixture to form a first slurry; (e) coating the first slurry on the monolithic substrate to form the first catalytic layer; (f) preparing second powder by causing rhodium to be carried on alumina; (g) preparing third powder by causing at least one noble metal selected from the group consisting of platinum and palladium; (h) preparing a second aqueous solution of the compound of at least metal selected from the group consisting of alkali metal, alkaline earth metal and rare earth metal; (i) forming a second mixture of the second powder, the third powder and the second aqueous solution; (j) grinding the second mixture to form a second slurry; and (k) coating the second slurry on the first catalytic layer formed on the monolithic substrate to form the second catalytic layer.

A still further aspect of the present invention reside in a method of producing an exhaust gas purifying catalyst including a monolithic substrate; a catalytic layer coated on the monolithic substrate, the catalytic layer containing at least one noble metal selected from the group consisting of platinum, palladium and rhodium, compound of at least one metal selected from the group consisting of alkali metal, alkaline earth metal and rare earth metal, and alumina, the catalytic layer having a surface section including a surface of the catalytic layer, and an inner section located inside relative to the surface section, wherein a difference in concentration between the surface section and the inner section of the catalytic layer is within a range of ±10%. The producing method comprises (a) preparing powder by causing the at least one noble metal selected from the group consisting of rhodium, platinum and palladium to be carried on alumina; (b) preparing an aqueous solution of the compound of at least one metal selected from the group consisting of alkali metal, alkaline earth metal and rare earth metal; (c) forming a mixture of the powder and the aqueous solution; (d) grinding the mixture to form a slurry; and (e) coating the slurry on the monolithic substrate to form the first catalytic layer.

BRIEF DESCRIPTION OF THE DRAWING

FIG. 1 (single FIGURE) is a fragmentary enlarged sectional view of an example of an exhaust gas purifying catalyst according to the present invention.

DETAILED DESCRIPTION OF THE INVENTION

According to a first aspect of the present invention, an exhaust gas purifying catalyst comprises a monolithic substrate. A first or inner catalytic layer (A) is formed on the monolithic substrate. The first catalytic layer contains at least one noble metal selected from the group consisting of rhodium, platinum and palladium. The first catalytic layer (A) further contains compound of at least one metal selected from the group consisting of alkali metal, alkaline earth metal and rare earth metal (element), and alumina. Additionally, a second or outer (surface-side) catalytic layer (B) is formed on the first catalytic layer and contains rhodium, at least one noble metal selected from the group consisting platinum and palladium. The second catalytic layer further contains compound of at least one metal selected from the group consisting of alkali metal, alkaline earth metal and rare earth metal, and alumina. A content of the compound of the at least one metal in the second catalytic layer (B) is larger than that in the first catalytic layer (A).

The exhaust gas purifying catalyst is for an internal combustion engine or a combustion device (burner, furnace or boiler). In this case, the exhaust gas purifying catalyst is a so-called NOx adsorption and reduction catalyst adapted to adsorb nitrogen oxides in exhaust gas which is in a lean region, and reduces the adsorbed nitrogen oxides in exhaust gas which is in a range including a rich region and a stoichiometric region. In the lean region, exhaust gas has an air/fuel ratio larger or leaner (in fuel) than a stoichiometric level, and therefore corresponds to so-called lean exhaust gas. In the stoichiometric region, exhaust gas has an air/fuel ratio around the stoichiometric level. In the rich region, exhaust gas has an air/fuel ratio smaller or richer (in fuel) than the stoichiometric level, and therefore corresponds to so-called rich exhaust gas.

Exhaust gas discharged from the engine or the combustion device contains SOx (sulfur oxides) in addition to NOx (nitrogen oxides), in which NOx is low in adsorptive activity as compared with SOx. Accordingly, when exhaust gas is in the lean region, NOx and SOx in exhaust gas is adsorbed in the NOx adsorption and reduction catalyst, in which NOx reaches not only the second or outer catalytic layer but also the first or inner catalytic layer. In contrast, almost all of SOx is adsorbed in the second or outer catalytic layer and cannot reach the first or inner catalytic layer. As a result, the catalyst is brought into a condition where NOx and SOx are adsorbed in the outer catalytic layer while NOx is adsorbed in the inner catalytic layer.

When exhaust gas becomes into the rich region or the stoichiometric region, the adsorbed NOx and SOx are released from the catalyst. At this time, NOx is released from both the outer and inner catalytic layers while SOx is released from the upper catalytic layer and hardly released from the inner catalytic layer.

In order that adsorbed SOx is released from the catalyst, a large amount of reducing agent is required. Examples of the reducing agent are HC, CO and the like contained in exhaust gas. in which it is assumed that a slight amount of such reducing agents can reach the inner layer; and SOx is hardly released from the inner layer even if it is adsorbed in the inner layer. Accordingly, if SOx is adsorbed in the outer layer as much as possible without reaching the inner layer when exhaust gas is in the lean region, SOx can be readily released from the catalyst when exhaust gas is in the rich region or the stoichiometric region.

According to the present invention, the catalyst contains compound(s) of alkali metal, alkaline earth metal and rare earth metal, serving as absorbing (trapping) agents for NOx and SOx. Additionally, the content of the compound(s) in the outer catalytic layer (B) is larger than that in the inner catalytic layer (A) thereby effectively adsorbing SOx into the outer catalytic layer (A). Since adsorbed SOx is readily released from the catalyst, sulfur-poisoning of the catalyst can be prevented thereby effectively reducing or removing NOx without lowering a NOx adsorbing ability even when exhaust gas is the lean region.

Here, assume that, for example, an upstream-side catalytic layer having a larger content of the above compound(s) is formed at an upstream side on the peripheral surface of a single monolithic substrate whereas a downstream-side catalytic layer having a smaller content of the above compound(s) is formed at the downstream side of the peripheral surface of the same monolithic substrate. In this case, if SOx cannot be sufficiently adsorbed by the upstream-side catalytic layer, SOx which has not been adsorbed is unavoidably flown onto the downstream-side catalytic layer. Accordingly, adsorbing and releasing SOx cannot be effectively accomplished thereby unavoidably causing sulfur-poisoning of the catalyst. Further, it will raise the problem that SOx released from the upstream-side catalytic layer again adheres onto the downstream-side catalytic layer.

In contrast, the catalyst according to the present invention takes such a multi-layer structure that the catalytic layer larger in content of the above compound(s) serves as the outer layer, thereby preventing sulfur-poisoning.

As discussed above, the content of the compound(s) of the alkali metal and/or the like is larger in the outer layer (B) than that in the inner layer (A), in which a ratio (by weight) in content of the compound(s) of alkali metal and/or the like between the outer layer (B) and the inner layer (A) is preferably higher than 1:1 and not higher than 3:1. If the ratio is not higher than 1:1, the effect of preventing sulfur-poisoning and lowering the NOx adsorbing ability cannot be obtained. If the ratio is higher than 3:1 so that the content of the compound(s) of alkali metal and/or the like is increased, thermal deterioration of noble metal(s) contained in the outer catalytic layer (B) becomes excessive.

Additionally, it is preferable that the content of the above compound(s) of alkali metal and/or the like is within a range of from 1 to 50 g (calculated as oxide) per one liter of the monolithic substrate. If the content is less than 1 g per one liter of the monolithic substrate, the effects of the above compound(s) of the alkali metal and/or the like for adsorbing NOx and SOx cannot be sufficiently obtained. Even if the content is increased over 50 g per one liter of the monolithic substrate, a meaningful effect corresponding to the increased content cannot be obtained while promoting thermal deterioration of Rh, Pt and the like.

The above-mentioned compound(s) of alkali metal and/or the like is/are alkali metal, alkaline earth metal and/or rare earth metal and therefore may be any combination of compound(s) of metal(s) such as alkali metal, alkaline earth metal and rare earth metal. Examples of the metal(s) are sodium (Na), potassium (K), rubidium (Rb), cesium (Cs), magnesium (Mg), calcium (Ca), strontium (Sr), barium (Ba), lanthanum (La), praseodymium (Pr), neodymium (Nd) and the like. Examples of the compound(s) are preferably in the form(s) of carbonate, oxide and hydroxide.

It is preferable that two kinds of the compounds respectively containing two metals are contained in each of the inner and outer catalytic layers (A), (B) thereby improving the effects of adsorbing and releasing SOx. This is assumed to be caused by the fact that the two kinds of the compounds of alkali metal and/or the like form a composite substance or compound, and therefore the composite substance promotes decomposition of sulfate compound which has been produced under sulfur-poisoning, thereby allowing SOx to be readily released. The effects of adsorbing and releasing SOx are particularly remarkable in case of combining the compound(s) of barium (Ba) and the compound(s) of magnesium (Mg). This has been apparent from the fact that a compound $BaMg(CO_3)2$ was formed, which was proved by a X-ray diffraction.

Each of the inner and outer catalytic layers (A), (B) contains noble metal(s) such as rhodium (Rh), platinum (Pt) and/or palladium (Pd), and alumina in addition to the above compound(s) of alkali metal and/or the like. The noble metal(s) may be any combination of rhodium, platinum and palladium. The noble metal(s) such as Rh and/or the like contained in the inner and outer catalytic layers (A), (B) function(s) as a so-called three-way catalyst for simultaneously oxidizing HC and CO and reducing NOx, in which the outer catalytic layer (B) contains Rh thereby improving the removing effect for NOx and SOx.

It is preferable that the content of alumina in each of the inner and outer catalytic layers (A) and (B) is not less than 100 g per one liter of the monolithic substrate. If the content is less than 100 g per one liter of the monolithic substrate, the compounds of the alkali metal and/or the like become into close contact with each other so as to tend to aggregate, thereby exhibiting insufficient effects as the NOx and SOx adsorbing agent.

It is also preferable that the content of the above noble metal(s) is within a range of from 1.5 to 3.0 g per one liter of the monolithic substrate. Adsorption and release of SOx can be effectively accomplished under a condition where such a small amount of the noble metal(s) is contained in the catalyst. If the content of the noble metal(s) is less than 1.5 g per one liter of the monolithic substrate, thermal deterioration of the noble metal(s) is excessive. If the content of the noble metal(s) exceeds 3.0 g per one liter of the monolithic substrate, SOx in an amount over a necessary level is adsorbed in the catalyst, and therefore SOx cannot be adsorbed only by the outer catalytic layer so as to unavoidably reach the inner catalytic layer, thus making it impossible to release SOx.

An example of the exhaust gas purifying catalyst according to the present invention is shown in FIG. 1. The exhaust gas purifying catalyst includes a honeycomb type (cordierite ceramic) monolithic substrate which has a plurality of cells (having a rectangular cross-section) which straight extends throughout the length of the monolithic substrate. Each cell is defined by four flat walls of the monolithic substrate. The catalytic layer is formed to cover the surfaces of the four flat walls defining the cell. The catalytic layer may be formed of a plurality of layers which are formed one upon another and different in structure and/or function. A gas passage is defined inside the catalytic layer. Exhaust gas discharged from the engine flows through the gas passage and purified under the action of catalyst components such as the noble metal(s), the above compound(s) of alkali metal and/or the like, and alumina which are contained in the catalytic layer.

According to a second aspect of the present invention, an exhaust gas purifying catalyst comprises a monolithic substrate. A catalytic layer is coated on the monolithic substrate. The catalytic layer contains at least one noble metal selected from the group consisting of platinum, palladium and rhodium. The catalytic layer further contains compound of at least one metal selected from the group consisting of alkali metal, alkaline earth metal and rare earth metal, and alumina. The catalytic layer has a surface section including a surface of the catalytic layer, and an inner section located inside relative to the surface section, in which a difference in concentration between the surface section and the inner section of the catalytic layer is within a range of ±10%. An example of the exhaust gas purifying catalyst takes a structure as shown in FIG. 1.

The compound(s) of the alkali metal and/or the like is preferably uniformly and highly dispersed in each of the inner and surface sections, in which specifically a difference in concentration between the inner section containing a central part and the surface section containing a surface is within a range of ±10%. This concentration difference can be specified under an analysis using a X-ray microanalyzer (XMA) or the like. Typically, in case of the catalytic layer having a thickness of 60 μm, the concentration of an upper-most surface part (in the surface section) containing the surface and the concentration of the central part lower by 30 μm from the surface of the catalytic layer are measured, thereby obtaining the difference in concentration. It will be understood that the thickness of the catalytic layer is a thickness of a flat part of the catalytic layer as indicated by the character T shown in FIG. 1 and not a thickness of a corner part of the catalytic layer.

Thus, the compound(s) of alkali metal and/or the like are uniformly contained in the catalytic layer, and therefore is/are highly dispersed in the catalytic layer. As a result, when the amount of reducing gas (HC, CO and NOx) is decreased relative to that of oxidizing gas ($O_2$ and NOx), NOx is adsorbed as $NO_2$ into the catalytic layer. Conversely, when the amount of the reducing gas is increased relative to that of the oxidizing gas, a reaction for releasing and reducing the adsorbed $NO_2$ is made and effectively progresses. Even if S is adhered to the catalytic layer, S tends to be readily released from the catalytic layer under the action of the reducing gas. This is assumed to be caused by the fact that the compound(s) of alkali metal and/or the like is/are carried in the catalytic layer in a highly dispersed condition so as to raise a releasing rate of S under the effect of the reducing agent.

It will be appreciated that the content, the kind and the like of the alumina, the noble metal(s) and the compound(s) of alkali metal and/or the like are not limited to particular ones in the exhaust gas purifying catalyst of the second aspect; however, they are preferably selected as same as those in the exhaust gas purifying catalyst of the first aspect thereby exhibiting a further high efficiency in adsorption and release of NOx while preventing sulfur-poisoning.

As will be understood, the above exhaust gas purifying catalysts are preferable to be high in heat resistance in view of the fact that the catalysts are subjected to high temperatures. Accordingly, it is preferable to add component(s) for improving the heat resistance of the noble metal(s), alumina and the like, to the catalytic layer. Examples of the improving component(s) are ceria, zirconia, lanthanum, barium and the like which have been conventionally used in the three-way catalyst.

The monolithic substrate of the exhaust gas purifying catalysts of the embodiments may be employed upon selecting from conventional ones which are formed of a refractory inorganic material. Preferably, the monolithic substrate is a honeycomb-type monolithic substrate or the like formed of cordierite, stainless steel or the like, in which powder (pulverized material) of the catalyst components of the catalytic layer is coated in the form of slurry on the surface of each wall defining the cell serving as the gas passage. Otherwise, the powder of the catalyst components themselves may be formed into a honeycomb structure.

The exhaust gas purifying catalysts according to the present invention can effectively reduce NOx preferably when air/fuel ratio of air/fuel mixture to be supplied to the engine is within a range of from 20 to 50 and a range of from 10.0 to 14.6.

Next, production of the above exhaust gas purifying catalysts according to the present invention will be discussed hereinafter.

The exhaust gas purifying catalyst of the first aspect is produced as follows: First, noble metal(s) such as Rh, Pt and/or Pd (i.e., Rh, Pt or Pd, or any combination of these noble metals) is/are carried on alumina powder thereby preparing catalytic powder. This catalytic powder is mixed with an aqueous solution of the compound(s) of alkali metal, alkaline earth metal and/or rare earth metal (i.e., alkali metal, alkaline earth metal or rare earth metal, or any combination of these metals) to prepare a mixture. This mixture is ground to prepare a slurry for the inner catalytic layer (A). This slurry is coated on the surface of the monolithic substrate thereby forming the inner catalytic layer (A) on the surface of the monolithic substrate, more specifically on the surface defining the cell of the monolithic substrate.

Subsequently, Rh is carried on alumina powder to prepare Rh-carried alumina powder. Pt and/or Pd are carried on alumina powder to prepare Pt and/or Pd-carried alumina. These powders are mixed with an aqueous solution of compound(s) of alkali metal, alkaline earth metal and/or rare earth metal (i.e., alkali metal, alkaline earth metal or rare earth metal, or any combination of these metals) to prepare a mixture. This mixture is ground to prepare a slurry for the outer catalytic layer (B). This slurry is coated on the inner catalytic layer (A) thereby forming the outer catalytic layer (B) on the inner catalytic layer (A).

It will be understood that each of the above mixtures may contain other component(s) such as material(s) for improving heat resistance of the catalyst.

In conventional technologies, a variety of methods have been employed to cause compound(s) of alkali metal and/or the like to be carried on a catalyst component. Typical one of these methods is as follows: First, a substrate is coated with a slurry which contains alumina or the like on which noble metal(s) and/or the like is carried. Thereafter, the thus coated substrate is immersed in an aqueous solution containing alkali metal(s) or the like so as to be impregnated with the alkali metal(s) or the like.

In contrast, according to the production method of the present invention, alumina carrying noble metal(s) is mixed with the aqueous solution of the compound(s) of alkali metal and/or the like to prepare the mixture. Then, the mixture is ground. Accordingly, particle size (diameter) of the compound(s) of alkali metal and/or the like is effectively decreased. As a result, even when sulfate compound is produced under occurrence of sulfur-poisoning, such sulfate compound tends to be readily decomposed. Additionally, even if the amount of noble metal(s) contained in the catalyst is relatively small, adsorption and release of NOx can be effectively achieved.

The above has been proved by measuring the particle size (diameter) of alkali metal(s) and/or the like using a X-ray diffraction (XRD) as follows: The average particle size (diameter) of alkali metal(s) and/or the like was 22 nm in the catalyst prepared by the production method of the present invention. In contrast, the average particle size (diameter) of alkali metal(s) and/or the like of the catalyst prepared by the method of the conventional technology (in which the substrate is impregnated with the solution of alkali metal and/or the like after it is coated with the slurry containing noble metal(s) and/or the like) was 27 nm.

It is preferable that power materials of the above-mentioned slurry has a median particle diameter of not larger than 4 µm. This decreases the particle size (diameter) of the alkali metal and/or the like, thereby further promoting the effect of causing sulfate compound produced under sulfur-poisoning to tend to be readily decomposed.

Additionally, in order to substantially uniformly and highly dispersing the compound(s) of alkali metal(s) and/or the like in the catalytic layer in such a manner that the difference in concentration of the compound(s) of alkali metal(s) and/or the like between the surface section and the inner section of the catalytic layer falls within the range of ±10% (by weight), the catalyst is prepared as follows, similarly to the production method as discussed above: First, noble metal(s) such as Rh, Pt and/or Pd (i.e., Rh, Pt or Pd, or any combination of these noble metals) is/are carried on alumina powder thereby preparing catalytic powder. This catalytic powder is mixed with an aqueous solution of compound(s) of alkali metal, alkaline earth metal and/or rare earth metal (i.e., alkali metal, alkaline earth metal or rare earth metal, or any combination of these metals) to prepare a mixture. This mixture is ground to prepare a slurry. This slurry is coated on the surface of the monolithic substrate thereby forming a catalytic layer on the surface of the monolithic substrate, more specifically on the surface defining each cell of the monolithic substrate.

According to such a production method, the compound(s) of alkali metal and/or the like can be carried on other catalyst components in a well dispersed state, and therefore a rate of releasing S from the catalyst under the action of the reducing gas can be increased thereby preventing sulfur-poisoning while maintaining a high efficiency of releasing and reducing NOx.

EXAMPLES

The present invention will be more readily understood with reference to the following Examples in comparison with Comparative Examples; however, these Examples are intended to illustrate the invention and are not to be construed to limit the scope of the invention.

Example 1

First, alumina powder was impregnated with an aqueous solution of dinitrodiammine Pt and then calcined in air at 400° C. for 1 hour after drying thereby obtaining Pt-carried alumina powder (Powder a) which had a Pt concentration of 1.0% by weight.

Subsequently, a porcelain ball mill was charged with Powder a, alumina, a solution of Ba acetate and water, upon which mixing and grinding was made in the ball mill, thereby obtaining a slurry. Powder materials (or catalyst components) contained in the slurry had a median particle diameter of 3 µm. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby forming an inner catalytic layer (A) having a weight of 110 g per one liter of the monolithic substrate.

Furthermore, alumina powder was impregnated with an aqueous solution of dinitrodiammine Pt and then calcined in air at 400° C. for 1 hour after drying thereby obtaining Pt-carried alumina powder (Powder b) which had a Pt concentration of 1.5% by weight.

Alumina powder was impregnated with an aqueous solution of Rh nitrate and then calcined in air at 400° C. for 1 hour after drying thereby obtaining Rh-carried alumina powder (Powder c) which had a Rh concentration of 2.0% by weight.

Subsequently, a porcelain ball mill was charged with Powder b, Powder c, alumina, a solution of Ba acetate and water, upon which mixing and grinding was made in the ball mill, thereby obtaining a slurry. Powder materials (or catalyst components) contained in the slurry had a median particle diameter of 3 µm. This slurry was coated on the inner catalytic layer (A) formed on the honeycomb-type cordierite ceramic monolithic substrate. The thus coated monolithic substrate was blown with air to remove excessive slurry in the cells under the action of air stream. Thereafter, the coated monolithic substrate was dried at 130° C. and then calcined at 400° C. for 1 hour thereby forming an outer catalytic layer (B) having a weight of 120 g per one liter of the monolithic substrate. Thus, the exhaust gas purifying catalyst of Example 1 was produced.

This catalyst contained Pt, Rh and Ba respectively in amounts of 2.0 g, 0.5 g and 30 g (calculated as oxide) per one liter of the monolithic substrate. Additionally, a weight ratio between Ba contained in the outer catalytic layer (B) and Ba contained in the inner catalytic layer (A) was 2:1.

Example 2

A procedure for preparation of Example 1 was repeated with the exception that a slurry for the inner catalytic layer (A) was obtained by charging a porcelain ball mill with Powder a, alumina, a solution of Ba acetate, a solution of Mg acetate tetrahydrate and water, upon which mixing and grinding was made in the ball mill; and a slurry for the outer catalytic layer (B) was obtained by charging a porcelain ball mill with Powder b, Powder c, alumina, a solution of Ba acetate, a solution of Mg acetate tetrahydrate and water, upon which mixing and grinding was made in the ball mill, thereby producing the exhaust gas purifying catalyst of Example 2.

This catalyst contained Pt, Rh, Ba and Mg respectively in amounts of 2.0 g, 0.5 g, 20 g (calculated as oxide) and 10 g (calculated as oxide) per one liter of the monolithic substrate. Additionally, a weight ratio between Ba and Mg contained in the outer catalytic layer (B) and Ba and Mg contained in the inner catalytic layer (A) was 2:1.

Comparative Example 1

A porcelain ball mill was charged with Powder a in Example 1, alumina and water, upon which mixing and grinding was made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby forming a catalytic layer having a weight of 100 g per 1 liter of the monolithic substrate. Thereafter, the monolithic substrate with the catalytic layer was impregnated with an aqueous solution of Ba acetate thereby forming an inner catalytic layer (C) having a weight of 110 g per one liter of the monolithic substrate.

Subsequently, a porcelain ball mill was charged with Powder b in Example 1, Powder c in Example 1, alumina and water, upon which mixing and grinding was made in the ball mill, thereby obtaining a slurry. This slurry was coated on the inner catalytic layer (C) formed on the honeycomb-type cordierite ceramic monolithic substrate. The thus coated monolithic substrate was blown with air to remove excessive slurry in the cells under the action of air stream. Thereafter, the coated monolithic substrate was dried at 130° C. and then calcined at 400° C. for 1 hour thereby forming a catalytic layer having a weight of 100 g per one liter of the monolithic substrate. Thereafter, the monolithic substrate with the catalytic layer was impregnated with an aqueous solution of Ba acetate thereby forming an outer catalytic layer (D) having a weight of 120 g per one liter of the monolithic substrate. Thus, an exhaust gas purifying catalyst of Comparative Example 1 was produced.

This catalyst contained Pt, Rh and Ba respectively in amounts of 2.0 g, 0.5 g and 30 g (calculated as oxide) per one liter of the monolithic substrate. Additionally, a weight ratio between Ba contained in the outer catalytic layer (D) and Ba contained in the inner catalytic layer (C) was 2:1.

Comparative Example 2

A porcelain ball mill was charged with Powder b in Example 1, Powder c in Example 1, alumina, a solution of Ba acetate and water, upon which mixing and grinding was made in the ball mill, thereby obtaining a slurry. Powder materials (or catalyst components) contained in the slurry had a median particle diameter of 3 µm. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a Catalyst 1 which was provided with a catalytic layer having a weight of 120 g per one liter of the monolithic substrate.

This Catalyst 1 contained Pt, Rh and Ba respectively in amounts of 1.0 g, 0.5 g and 20 g (calculated as oxide) per one liter of the monolithic substrate.

A porcelain ball mill was charged with Powder a in Example 1, a solution of Ba acetate and water, upon which mixing and grinding was made in the ball mill, thereby obtaining a slurry. Powder materials (or catalyst components) contained in the slurry had a median particle diameter of 3 µm. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a Catalyst 2 which was provided with a catalytic layer having a weight of 110 g per one liter of the monolithic substrate.

This Catalyst 2 contained Pt and Ba respectively in amounts of 1.0 g and 10 g (calculated as oxide) per one liter of the monolithic substrate.

The Catalysts 1, 2 were disposed in series and located respectively on upstream-side and downstream-side relative to flow of exhaust gas, thus constituting an exhaust gas purifying catalyst (unit) of Comparative Example 2.

Comparative Example 3

A procedure of Example 1 was repeated with the exception that the outer catalytic layer (B) and the inner catalytic layer (A) were respectively formed to have weights of 90 g and 80 g per one liter of the monolithic substrate, thereby producing an exhaust gas purifying catalyst of Comparative Example 3.

Comparative Example 4

A procedure for preparation of Example 1 was repeated with the exception that the powder materials (or catalyst components) of each of the slurries for forming the inner and outer catalytic layers (A), (B) had a median particle diameter of 5 µm, thereby producing an exhaust gas purifying catalyst of Comparative Example 4.

Comparative Example 5

A procedure for preparation of Example 1 was repeated with the exception that the solution of Ba acetate was used in such an amount that the resultant catalyst contained 60 g (calculated oxide) per one liter of the monolithic substrate, thereby producing an exhaust gas purifying catalyst of Comparative Example 5.

Evaluation of Performance for Exhaust Gas Purifying Catalyst of Examples 1 and 2 and Comparative Examples 1 to 5

Evaluation test (for emission performance) was conducted on the exhaust gas purifying catalysts of Examples 1 and 2 and Comparative Examples 1 to 5, using an internal combustion engine having a displacement of 2000 cc, provided with an exhaust system including an exhaust pipe. For the evaluation test, each exhaust gas purifying catalyst was disposed inside a casing to constitute a catalytic converter. The catalytic converter was disposed in the exhaust pipe of the exhaust system of the engine.

Prior to the evaluation test, each of the catalysts of Examples and Comparative Examples underwent a durability test in which each catalyst was disposed as the catalytic converter in an exhaust pipe of an exhaust system of an internal combustion having a displacement of 4400 cc. The durability test was conducted as follows: The engine was operated for 50 hours using a regular gasoline (in Japan) as fuel while keeping a temperature at a converter inlet position immediately upstream of the catalyst at 650° C. After the durability test, the engine was operated for 5 hours using a gasoline (having a S concentration of 300 ppm) as fuel while keeping the temperature at the converter inlet position at 350° C., thereby applying a so-called sulfur-poisoning treatment on the catalyst. Subsequently, the engine was operated for 30 minutes using the regular gasoline while keeping the temperature at the converter inlet position at 650° C., thereby applying a so-called sulfur-releasing treatment on the catalyst In the evaluation test, the engine was operated in a manner to repeat an operational cycle which included a lean operation at a lean air-fuel ratio (A/F=20.0) for 10 seconds, a rich operation at a rich air-fuel ratio (A/F=11.0) for 2 seconds and a stoichiometric operation at a stoichiometric air-fuel ratio (A/F=14.7) for 5 seconds. During such engine operation, the temperature of exhaust gas immediately upstream of the catalyst was kept at 350° C. During the engine operation, concentrations (volume or ppm) of an exhaust gas component (HC, CO, NOx) was measured respectively at positions of the exhaust pipe upstream and downstream of the exhaust gas purifying catalyst. Such measurement was made on the catalyst both in a first state obtained after a durability test and a second state obtained after the sulfur-releasing treatment. The conversion rate (%) was calculated by [(1−the concentration of the gas component in the exhaust pipe downstream of the catalyst/the concentration of the gas component in the exhaust pipe upstream of the catalyst)×100]. Thus, the convention rate (%) was determined for the catalyst both in the first and second states.

Results (conversion rates) of the evaluation test were shown in Table 1.

TABLE 1

|  | After durability test | | | After sulfur-releasing treatment | | |
|---|---|---|---|---|---|---|
|  | HC | CO | NOx | HC | CO | NOx |
| Example 1 | 95 | 95 | 80 | 97 | 96 | 75 |
| Example 2 | 97 | 98 | 85 | 98 | 98 | 82 |
| Compar. Example 1 | 95 | 95 | 78 | 96 | 96 | 63 |
| Compar. Example 2 | 95 | 95 | 75 | 95 | 95 | 58 |
| Compar. Example 3 | 95 | 94 | 70 | 95 | 95 | 41 |
| Compar. Example 4 | 95 | 95 | 78 | 96 | 96 | 68 |
| Compar. Example 5 | 93 | 93 | 78 | 95 | 95 | 44 |

Example 3

First, alumina powder was impregnated with an aqueous solution of dinitrodiammine Pt and then calcined in air at 400° C. for 1 hour after drying thereby obtaining Pt-carried alumina powder (Powder d) which had a Pt concentration of 1.0% by weight.

Boehmite alumina powder was impregnated with an aqueous solution of Rh nitrate and then calcined in air at 400° C. for 1 hour after drying thereby obtaining Rh-carried boehmite alumina powder (Powder e) which had a Rh concentration of 1.0% by weight.

Subsequently, a porcelain ball mill was charged with Powder d, Power e, alumina powder and a solution of Ba acetate, upon which mixing and grinding was made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby forming a catalytic layer having a weight of 100 g per one liter of the monolithic substrate. Then, operation of coating the slurry on the monolithic substrate was again made thereby adding a catalytic layer (having a weight of 130 g per one liter of the monolithic substrate) on the previously formed catalytic layer, thereby finally forming a catalytic layer (on the monolithic substrate) having a weight of 230 g per one liter of the monolithic substrate. Thus, the exhaust gas purifying catalyst of Example 3 was produced.

This catalyst contained Pt, Rh and Ba respectively in amounts of 2.0 g, 0.5 g and 30 g (calculated as oxide) per one liter of the monolithic substrate. A distribution condition of Ba in the catalytic layer was inspected by the X-ray microanalyzer (XMA). As a result, it was confirmed that the concentration difference of Ba between the surface section and the inner section was within the range of ±10% both in the previously formed catalytic layer and the added catalytic layer.

Comparative Example 6

First, alumina powder was impregnated with an aqueous solution of dinitrodiammine Pt and then calcined in air at 400° C. for 1 hour after drying thereby obtaining Pt-carried alumina powder (Powder d) which had a Pt concentration of 1.0% by weight.

Boehmite alumina powder was impregnated with an aqueous solution of Rh nitrate and then calcined in air at 400° C. for 1 hour after drying thereby obtaining Rh-carried boehmite alumina powder (Powder e) which had a Rh concentration of 1.0% by weight.

Subsequently, a porcelain ball mill was charged with Powder d, Power e and alumina powder, upon which mixing and grinding was made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby forming a catalytic layer having a weight of 100 g per 1 liter of the monolithic substrate. Then, operation of the slurry coating and catalytic layer formation on the monolithic substrate was again made thereby adding a catalytic layer (having a weight of 100 g per one liter of the monolithic substrate) on the previously formed catalytic layer, thereby forming a catalytic layer (on the monolithic substrate) having a weight of 200 g per one liter of the monolithic substrate. Thereafter, the thus formed catalytic layer was impregnated with an aqueous solution of Ba acetate, thereby finally forming a catalytic layer (on the monolithic substrate) having a weight of 230 g per one liter of the substrate. Thus, an exhaust gas purifying catalyst of Comparative Example 6 was produced.

This catalyst contained Pt, Rh and Ba respectively in amounts of 2.0 g, 0.5 g and 30 g (calculated as oxide) per one liter of the monolithic substrate. A distribution condition of Ba in the catalytic layer was inspected by the X-ray microanalyzer (XMA). As a result, it was confirmed that the concentration difference of Ba in the surface section relative to that in the inner section was about +10% in the previously formed catalytic layer, whereas the concentration difference of Ba in the surface section relative to that in the inner section was about +15% in the previously formed catalytic layer.

Example 4

A procedure of Example 3 was repeated with the exception that the porcelain ball mill was charged with Mg acetate in addition to Powder d, Power e, alumina powder and a solution of Ba acetate, thereby producing an exhaust gas purifying catalyst of Example 4 provided with a finally formed catalytic layer having a weight of 230 g per one liter of the monolithic substrate.

This catalyst contained Pt, Rh, Ba and Mg respectively in amounts of 2.0 g, 0.5 g, 20 g (calculated as oxide) and 10 g (calculated as oxide) per one liter of the monolithic substrate. A distribution condition of Ba and Mg in the catalytic layer was inspected by the X-ray microanalyzer (XMA). As a result, it was confirmed that the concentration difference of Ba and Mg between the surface section and the inner section was within the range of ±10% both in the previously formed catalytic layer and the added catalytic layer.

Evaluation of Performance for Exhaust Gas Purifying Catalysts of Examples 3 and 4 and Comparative Example 6

The same evaluation test (for emission performance) conducted on Examples 1 and 2 and Comparative Examples 1 to 5 was also conducted on the exhaust gas purifying catalysts of Examples 3 and 4 and Comparative Example 6 with the exception that no sulfur-poisoning treatment and no sulfur-releasing treatment were carried out. Accordingly, in the evaluation test, the conversion rate (%) was determined only for the exhaust gas purifying catalyst in the state obtained after the durability test.

TABLE 2

| | After durability test | | |
|---|---|---|---|
| | HC | CO | NOx |
| Example 3 | 99 | 90 | 92 |
| Compar. Example 6 | 98 | 90 | 85 |
| Example 4 | 98 | 91 | 95 |

As appreciated from the above, according to the present invention, compound of alkali metal and/or like is contained in a larger amount in a surface layer part of a catalytic layer than that in an inner layer of the same, while the compound of alkali metal and/or the like is mixed with a slurry for forming the catalytic layer in a method of producing the catalyst. Accordingly, the catalyst can effectively adsorb (trap), release and reduce (remove) NOx while preventing sulfur-poisoning of the catalyst.

The entire contents of Japanese Patent Application P2000-341458 (filed Nov. 9, 2000) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A method of producing an exhaust gas purifying catalyst adapted to adsorb nitrogen oxides in exhaust gas which is in a lean region, and to reduce the adsorbed nitrogen oxides in exhaust gas which is in a range including a rich region and a stoichiometric region, said exhaust gas purifying catalyst including a monolithic substrate; a first catalytic layer formed on said monolithic substrate, said first catalytic layer containing at least one noble metal selected from the group consisting of rhodium, platinum and palladium, a compound of at least one metal selected from the group consisting of alkali metal, alkaline earth metal and rare earth metal, and alumina; and a second catalytic layer formed on said first catalytic layer and containing rhodium, at least one noble metal selected from the group consisting of platinum and palladium, a compound of at least one metal selected from the group consisting of alkali metal, alkaline earth metal and rare earth metal, and alumina, a content of the compound of at least one metal in said second catalytic layer being larger than that in said first catalytic layer,
said method comprising:
preparing a first powder by causing the at least one noble metal selected from the group consisting of rhodium, platinum and palladium to be carried on alumina;
preparing a first aqueous solution of the compound of at least one metal selected from the group consisting of alkali metal, alkaline earth metal and rare earth metal;
forming a first mixture of the first powder and the first aqueous solution;
grinding the first mixture to form a first slurry;
coating the first slurry on the monolithic substrate to form the first catalytic layer;
preparing a second powder by causing rhodium to be carried on alumina;
preparing a third powder by causing at least one noble metal selected from the group consisting of platinum and palladium to be carried on alumina;
preparing a second aqueous solution of the compound of at least one metal
selected from the group consisting of alkali metal, alkaline earth metal and rare earth metal;
forming a second mixture of the second powder, the third powder and the second aqueous solution;
grinding the second mixture to form a second slurry; and
coating the second slurry on the first catalytic layer formed on the monolithic substrate to form the second catalytic layer.

2. A method as claimed in claim 1 wherein powder materials of each of the first and second slurries have a median particle diameter of not larger than 4 μm.

3. A method as claimed in claim 1, wherein the at least one metal selected from the group consisting of alkali metal, alkaline earth metal and rate earth metal is at least one metal selected from the group consisting of sodium (Na), potassium (K), rubidium (Rb), cesium (Cs), magnesium (Mg), calcium (Ca), strontium (Sr), barium (Ba), lanthanum (La), praseodymium (Pr), and neodymium (Nd).

4. A method as claimed in claim 1, wherein the at least one metal selected from the group consisting of alkali metal, alkaline earth metal and rare earth metal comprises at least two metals selected from the group consisting of alkali metal, alkaline earth metal and rare earth metal.

5. A method of producing an exhaust gas purifying catalyst adapted to adsorb nitrogen oxides in exhaust gas which is in a lean region, and to reduce the adsorbed nitrogen oxides in exhaust gas which is in a range including a rich region and a stoichiometric region, said exhaust gas purifying catalyst including a monolithic substrate; a catalytic layer coated on said monolithic substrate, said catalytic layer containing at least one noble metal selected from the group consisting of platinum, palladium and rhodium, a compound of at least one metal selected from the group consisting of alkali metal, alkaline earth metal and rare earth metal, and alumina, said catalytic layer having a surface section including a surface of said catalytic layer, and an inner section located inside relative to the surface section, wherein a difference in concentration of said compound between the surface section and the inner section of said catalytic layer is within a range of ±10%, the method comprising:

preparing powder by causing the at least one noble metal selected from the group consisting of rhodium, platinum and palladium to be carried on alumina;

preparing an aqueous solution of the compound of at least one metal selected from the group consisting of alkali metal, alkaline earth metal and rare earth metal;

forming a mixture of the powder and the aqueous solution;

grinding the mixture to form a slurry; and coating the slurry on the monolithic substrate to form the catalytic layer.

6. A method of producing an exhaust gas purifying catalyst, comprising:

preparing a powder comprising at least one noble metal selected from the group consisting of rhodium, platinum and palladium on alumina;

preparing an aqueous solution of a compound of at least one metal selected from the group consisting of an alkali metal, an alkaline earth metal and a rare earth metal;

forming a mixture of the powder and the aqueous solution;

grinding the mixture to form a slurry; and coating the slurry on a monolithic substrate to form a first catalytic layer.

7. The method of claim 6, further comprising:

preparing a second powder comprising rhodium carried on alumina;

preparing a third powder comprising at least one noble metal selected from the group consisting of platinum and palladium carried on alumina;

preparing a second aqueous solution of a compound of at least one metal selected from the group consisting of an alkali metal, an alkaline earth metal and a rare earth metal;

forming a second mixture of the second powder, the third powder and the second aqueous solution;

grinding the second mixture to form a second slurry; and coating the second slurry on top of the first catalytic layer to form a second catalytic layer.

8. The method according to claim 7, further comprising controlling the concentration of the at least one metal selected from the group consisting of an alkali metal, an alkaline earth metal and a rare earth metal in the second layer such that the concentration in the second layer is greater than the concentration of the at least one metal selected from the group consisting of an alkali metal, an alkaline earth metal and a rare earth metal in the first catalytic layer.

* * * * *